(12) United States Patent
Liu et al.

(10) Patent No.: US 6,299,795 B1
(45) Date of Patent: Oct. 9, 2001

(54) POLISHING SLURRY

(75) Inventors: Lei Liu, Carmel; Doris Kwok, Fishers, both of IN (US)

(73) Assignee: Praxair S.T. Technology, Inc., North Haven, CT (US)

(*) Notice: Subject to any disclaimer, the term of this patent is extended or adjusted under 35 U.S.C. 154(b) by 0 days.

(21) Appl. No.: 09/484,242

(22) Filed: Jan. 18, 2000

(51) Int. Cl.$^7$ .................................. C09K 3/14; B24B 1/00
(52) U.S. Cl. .............................. 252/79.2; 106/3; 216/89; 252/79.4
(58) Field of Search .................. 252/79.1, 79.2, 252/79.3, 79.4; 216/88, 89; 438/692, 693; 106/3

(56) References Cited

U.S. PATENT DOCUMENTS

| | | | |
|---|---|---|---|
| 4,956,015 | 9/1990 | Okajima et al. | 106/3 |
| 5,366,542 | 11/1994 | Yamada et al. | 106/3 |
| 5,418,273 | 5/1995 | Dromard et al. | 524/437 |
| 5,575,837 | 11/1996 | Kodama et al. | 106/3 |
| 5,733,819 | 3/1998 | Kodama et al. | 438/692 |
| 5,868,604 | 2/1999 | Atsugi et al. | 451/36 |
| 5,997,620 | 12/1999 | Kodama et al. | 106/3 |

FOREIGN PATENT DOCUMENTS

| | | |
|---|---|---|
| 411413 | 2/1991 | (EP). |
| WO98/23697 | 4/1998 | (WO). |
| 9823697 | 6/1998 | (WO). |

OTHER PUBLICATIONS

Kirk–Othmer,Encyclopedia of Chemical Technology, vol. 7, (1979) pp 802–803.

*Primary Examiner*—William Powell
(74) *Attorney, Agent, or Firm*—Blake T. Biederman

(57) ABSTRACT

The polishing slurry includes polishing particles having a mean particle diameter of less than about 5 $\mu$m. The slurry contains at least about 0.5 weight percent oxidizer selected from at least one of the group consisting of $HNO_3$, $Ni(NO_3)_2$, $Al(NO_3)_3$, $Mg(NO_3)_2$, $Zn(NO_3)_2$ and $NH_4NO_3$. A small but effective amount of a co-oxidizer selected from the group consisting of perbromates, perchlorates, periodates, persulfates, permanganates and ferric nitrate accelerates removal of substrates; and water forms the balance of the aqueous slurry.

20 Claims, 1 Drawing Sheet

POLISHING SLURRY

TECHNICAL FIELD

This invention relates to polishing slurries. In particular, this invention relates to slurries for polishing nickel-plated hard disks with an enhanced removal rate and a reduced surface roughness.

BACKGROUND ART

The typical manufacturing process for memory hard disk media involves plating an aluminum disk substrate with a layer of nickel phosphorus alloy. Polishing this nickel alloy's surface with a fine polishing slurry obtains a smooth and flat surface. This polished nickel-plated substrate is then suitable for application of a layer of magnetic storage media, such as used for hard disks. The increasing demands for higher storage capacity in hard drive manufacturing have necessitated a substantial increase in areal density, i.e., data storage capacity per unit surface area, on the disk media. This requires that significant improvements be made in the manufacturing of the rigid hard disks, including enhanced plating uniformity, reduced surface roughness after polishing, and enhanced texturing characteristics. The polishing process is one of the critical factors required to fulfill these new requirements.

Significant improvements in surface inspection metrology have allowed disk manufacturers to inspect for small surface defects previously undetectable. This technology advancement has led to optimization of polishing parameters to reduce defects including: polishing cycle time; polishing pressure; and resolution rate of upper and lower table of the polishing machine. Optimizing polishing parameters requires a high degree of expertise and is time consuming. Other advances have been made in the area of consumables, such as, polishing pads, abrasive slurries, and cleaning materials. Unfortunately, conventional aluminum oxide slurries (5 to 50 $m^2/g$, surface area and 1 to 10 $\mu m$ mean diameter, size distribution) create micro-scratches and micro-pits on substrates' surfaces. Because these slurries create these defects, it is difficult for disk manufacturers to obtain smooth surfaces using conventional alumina slurries, i.e., a roughness of less than 3 Å, which is preferred for good deposition of a magnetic layer.

Conventional polishing slurries can result in uneven plating of the magnetic layer after polishing the substrate. Since the clearance between magnetic heads and the magnetic layer is less than 0.2 $\mu m$, small surface defects on the magnetic layer such as nodules may crash and damage the magnetic heads. Other defects, such as scratches and pits, cause errors in reading or writing information on hard disks. There are several possible causes for these defects, including: 1) the surface morphologies of the aluminum oxide abrasives are irregular or contain sharp edges where the grinding action of these abrasives on the substrate's surface introduces polish scratches; 2) the presence of unwanted fine aluminum oxide particles generated from the abrasive's size reduction process causes micro-pits; and 3) the agglomeration of the aluminum oxide particles in the polishing slurry and in the pores of the polishing pads causes scratches or pits in the substrate's surface. For the above reasons, it is difficult for disk manufacturers to achieve a defect-free and low roughness surface, i.e., Ra (peak-to-valley height) of less than 3 Å with conventional alumina-based slurries.

The increasing demands of the computer hard disk industry for defect-free and low roughness surfaces have forced slurry manufacturers to explore alternative polishing agents, such as, solution derived colloidal metal oxide materials. The mean diameters of these colloidal particles are typically in the range of 0.01 to 1 $\mu m$; and these small and soft particles potentially offer enhanced substrate surface characteristics. However, slurry manufacturers are currently encountering two problems with colloidal slurries. First, the polishing rates of these slurries are substantially lower than conventional alumina-based slurries—disk manufacturers utilizing colloidal based slurries have to increase polishing cycle time, slurry consumption and even the number of polishing machines in order to maintain the required production throughput. Second, these colloidal particles also have a strong tendency to aggregate, coagulate and gel due to their small particle sizes, high ionic strength, and the low pH range. Therefore, colloidal slurries often have a short or insufficient shelf life.

Manufacturers have attempted to use smaller and/or softer alumina-based abrasive particles and different chemical additives such as chelating agents and oxidizers to reduce or eliminate surface irregularities. Furthermore, slurry manufacturers have attempted to use various unstable oxidizers such as hydrogen peroxide, aluminum nitrate and ferric nitrate to enhance the polishing removal rate. These oxidizers cannot be premixed with the slurry; and disk manufacturers must add these oxidizers, such as ferric nitrate at their point of use. The use of ferric nitrate is also undesirable because it stains the polishing equipment.

Other manufacturers have used various unconventional abrasives such as boehmite and fumed metal oxides to achieve smooth substrates surfaces. Kodama et al., in U.S. Pat. No. 5,575,837, disclose the use of a persulfate accelerator with a silica sol or gel. In addition, Streinz et al., in PCT Pub. No. 98/23697 disclose the use of a triple salt of $2KHSO_5 \cdot KHSO_4 \cdot K_2SO_4$ (approximately 50% monopersulfate) or hydrogen peroxide oxidizers with a ferric nitrate catalyst for use with fumed silica and alumina dispersions for polishing hard disk substrates.

Dromard et al., in U.S. Pat. No. 5,418,273, disclose the use of anionic dispersing agents, such as sodium polyacrylate or polymethacrylate. These dispersing agents stabilize an aqueous suspension of anhydrous alumina and silica for papermaking industry coatings. Some slurry manufacturers have attempted to stabilize basic colloidal silica slurries, which is stable over an extended period of time. Although the suspension is stable, the polishing rate is substantially slower than conventional acidic alumina slurries. Adding various chemical oxidizers such as hydrogen peroxide, aluminum nitrate and ferric nitrate to these slurries increases their polishing rate.

These oxidizers either reduce the shelf life of the slurries or they become unstable before they reach the end-users. Another alternative is to add the oxidizer solution to the slurries at the point of use; however, it is undesirable for disk manufacturers, because special handling and storage facilities for the hazardous materials are required at end-users' sites.

It is an object of the invention to provide a slurry for reducing surface roughness of metal substrates.

It is a further object of the invention to provide a slurry for accelerating the polishing process.

It is a further object of the invention to provide a stable colloidal polishing slurry with enhanced polishing characteristics and minimized surface defects.

It is a further object of the invention to provide a polishing slurry having improved polishing performance on Ni-P plated substrates for computer hard disks.

SUMMARY OF THE INVENTION

The polishing slurry includes polishing particles having an a mean particle diameter of less than about 5 µm. The slurry contains at least about 0.5 weight percent oxidizer selected from at least one of the group consisting of $HNO_3$, $Ni(NO_3)_2$, $Al(NO_3)_3$, $Mg(NO_3)_2$, $Zn(NO_3)_2$ and $NH_4NO_3$. A small but effective amount of a co-oxidizer selected from the group consisting of perbromates, perchlorates, periodates, persulfates, permanganates and ferric nitrate accelerates removal of substrates; and water forms the balance of the aqueous slurry.

DETAILED DESCRIPTION

Figure 1:
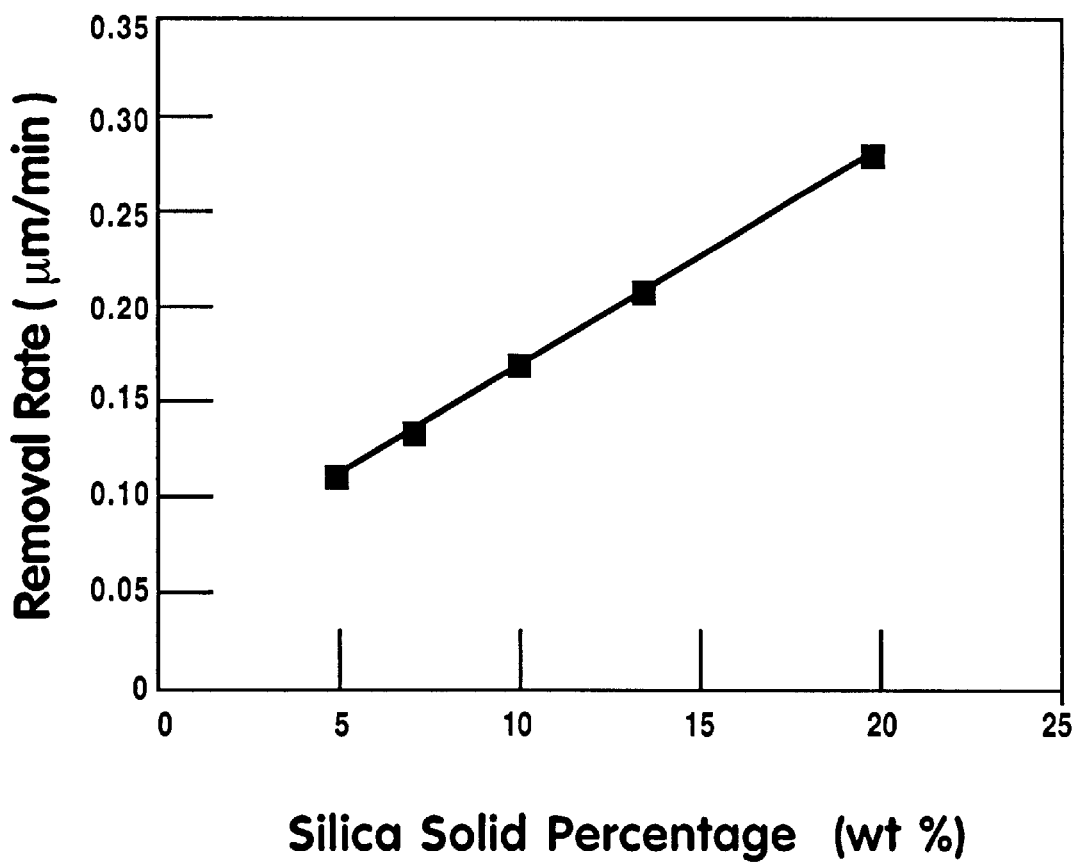
FIG. 1 shows nickel stock removal rate's dependence on the silica colloid concentration.

The present invention relates to polishing slurry compositions that enhance polishing characteristics. These slurries contain abrasive particles or colloidal materials such as oxides, nitrides, carbides and borides as a polishing agent. The use of colloidal-sized particles in the polishing slurry substantially improves the substrate surface characteristics, reduces surface roughness and minimizes or eliminates all surface defects. The use of multi-oxidizer combination in the slurry greatly enhances the polishing rate by 50 to 250 percent. Typical oxidizers and co-oxidizers include nitric acid, metal salts of nitrate, perchlorate, persulfate, periodate and permanganate. The concentrations of these oxidizers and co-oxidizers operate in the range of 0.01 to 50 weight percent. Unless expressly noted otherwise, this specification refers to all compositions in weight percent. For economic reasons however, the slurry advantageously operates with less than 10 weight percent total oxidizers and co-oxidizers. Although this slurry operates on various metallic and non-metallic surfaces, it provides superior polishing for nickel-plated rigid hard disks. For example, this polishing mixture achieves a surface roughness of less than about 2 Å for nickel-phosphorus-plated hard disks.

The composition of this slurry relies upon the interaction of several ingredients. Water serves as the dispersing medium of the slurry and forms the balance of the composition.

Advantageously, adding about 2 to 60 weight percent polishing particles, having a mean particle diameter of less than about 5 µm, forms the aqueous slurry. Examples of polishing agents include oxides, nitrides, carbides and borides. In particular, colloidal oxides, such as silica, alumina, ceria, zirconia, titania having a mean diameter less than about 1 µm form excellent polishing slurries for ultra-smooth surfaces. A typical polishing slurry described here, normally an aqueous dispersion, is made up of silica or alumina colloidal polishing agents with having a mean diameter preferably in the range of about 0.01 µm to 1 µm. The minimum mean diameter of at least 0.01 µm ensures commercially practical nickel-phosphorus removal rates.

The slurry contains at least 0.5 weight percent total of at least one or a combination of primary oxidizers or accelerators selected from the group consisting of $HNO_3$, $Ni(NO_3)_2$, $Al(NO_3)_3$, $Mg(NO_3)_2$, $Zn(NO_3)_2$, $NH_4NO_3$. Experimental data have shown that iron nitrate compounds do not serve as effective primary oxidizers. Unlike the nitrate compounds of the above list that oxidize the substrate by forming nitric acid in a water solution, the ferric component in iron nitrate functions as a relatively weak oxidizer. Advantageously, the oxidizer consists of about 0.75 to 7.5 weight percent of the slurry. Most advantageously, the primary oxidizer forms about 1 to 5 weight percent of the slurry.

In addition to the oxidizer, the slurry contains a small but effective amount of at least one or more co-oxidizers selected from the group consisting of perbromates, perchlorates, periodates, persulfates and permanganates ferric nitrate. Small amounts as low as at least about 0.01 weight percent co-oxidizer appears to have a synergistic effect with the oxidizer in the slurry. Specific examples of effective co-oxidizers include, $KIO_4$, $NaIO_4$, $(NH_4)_2S_2O_8$, $K_2S_2O_8$, $Na_2S_2O_8$, $KMnO_4$, $Al(ClO_4)_3$, $KClO_4$, $NaClO_4$, $NH_4ClO_4$ and $Fe(NO_3)_3$. Advantageously, the slurry contains about 0.01 to 4 weight percent co-oxidizer to accelerate the removal of the substrate. Most advantageously, the slurry contains about 0.05 to 2 weight percent co-oxidizer for optimal removal of nickel-phosphorus substrates.

When using periodate salts as co-oxidizers, most advantageously the polishing slurry contains an additive for preventing elemental iodine from releasing into the atmosphere. These additives include polymers and co-polymers (with the linear and crosslinked structures of these polymers and co-polymers) such as, polyvinylpyridine and polyvinylpyrrolidone, vinylpyrrolidone/vinylacetate, vinylpyrrolidone/vinylmethacrylate, vinylpyrrolidone/vinylacrylic acid, vinylpyrrolidone/styrene, vinylpyrrolidone/vinylcaprolactam, vinylpyrrolidone/vinylimidazole, etc. Linear polymers of various molecular weights may tie-up the iodine produced during the polishing process. Similarly, co-polymers of various co-polymer ratios and combinations can tie-up the iodine. Furthermore, crosslinked polymers of all various crosslink percentages bind the iodine. In addition, derivatives of these polymer additives, such as, substitutions should also be effective in binding iodine.

Optionally, pH buffers or adjusters such as, strong acids maintain the slurry as an acidic solution. For example, nitric, sulfuric, hydrochloric, acetic, gluconic and succinic acids readily adjust pH to the most advantageous range. Most advantageously, the pH buffers adjust the slurry's pH to a value between about 1 and 5. In addition, when using colloidal particles, it is advantageous to add an anti-coagulation agent to the slurry. Advantageously, the slurry contains about 0.001 to 5 percent by weight of the anti-coagulation agents. Most advantageously it contains a polymeric anti-coagulation agents, such as polyvinylsulfonate, polystyrenesulfonate, polyacrylate, polystyrenesulfonic-co-maleic acid or an equivalent.

When preparing the slurry, manufacturers can use either solid or aqueous solution forms of anti-coagulation agents, oxidizer(s), and co-oxidizers. Furthermore, it is advantageous to prepare the slurry dispersion under agitation.

In the examples presented herein, the polishing performance of different slurries was evaluated on a Strasbaugh 6EE polisher, in which nickel-phosphorus plated memory hard discs were polished by sliding the disks between two rotating and pressed polymeric pads. The down pressure used was 80 $g/cm^2$. The polishing pads were Politex DG HI made by Rodel Inc. The disks were polished for 6 minutes and the slurry flow rate was set constant at 325 ml/minute. After completion of each polishing cycle, the disks were cleaned in a Vtech disk cleaner and dried with a Semitool spin rinser/dryer. The nickel stock removal rate was determined by measuring the total mass loss of the disks before and after polishing; whereas the surface roughness (Ra) was measured by a Veeco TMS 2000 and a Digital Instruments AFM apparatus. The surface defects were examined visually using an optical microscope and also using an optical inspection system, Hitachi RS1350.

Table 1 shows examples of polishing performance for various slurry compositions. Without any oxidizer, the silica colloids alone resulted in nearly zero removal rate that indicated the absence of mechanical abrasion from colloid particles. With various oxidizer and co-oxidizer combinations however, the total nickel stock removal rate was achieved as high as 0.28 μm/min. The primary oxidizers contributed up to 50 percent of the total removal rate and were also essential to maintain good substrate flatness. Addition of various co-oxidizers and their combinations increased the removal rate by as much as two-fold. Among all of the co-oxidizers, periodate salt was the most effective removal rate booster. Although the presence of co-oxidizers and their combinations increased removal rates significantly, the benefit diminished as their concentration increased. This indicated that optimal quantity and combination of co-oxidizers were critical to maximize the total removal rate. Excessive amounts of co-oxidizers gave no additional removal rate improvement. The overall results shown in Table 1 may also suggest that the silica colloids only serve as carriers that assist the chemical polishing process rather than directly contributing to nickel removal through mechanical abrasion.

TABLE 1

Examples of Polishing Performance Data for Various Slurry Compositions

| Sample ID | Abrasive, (wt %) | Mean Diameter (nm) | Oxidizer (wt %) | Co-Oxidizers (wt %) | Removal Rate (μm/min) |
|---|---|---|---|---|---|
| 1 | $SiO_2$, 14 | 100 | None | None | ~0 |
| 2 | $SiO_2$, 14 | 100 | 2.6 $Al(NO_3)_3$, 2.2 $NH_4NO_3$ | None | 0.10 |
| 3 | $SiO_2$, 14 | 100 | 2.6 $Al(NO_3)_3$, 2.2 $NH_4NO_3$ | 0.26 $KIO_4$ | 0.22 |
| 4 | $SiO_2$, 14 | 100 | 2.6 $Al(NO_3)_3$, 2.2 $NH_4NO_3$ | 0.26 $(NH_4)_2S_2O_8$ | 0.14 |
| 5 | $SiO_2$, 14 | 100 | 2.6 $Al(NO_3)_3$, 2.2 $NH_4NO_3$ | 0.26 $Al(ClO_4)_3$ | 0.12 |
| 6 | $SiO_2$, 7 | 100 | 2.6 $Al(NO_3)_3$, 2.2 $NH_4NO_3$ | 0.26 $NaIO_4$ | 0.17 |
| 7 | $SiO_2$, 7 | 100 | 2.6 $Al(NO_3)_3$, 2.2 $NH_4NO_3$ | 0.26 $NaIO_4$, 0.26 $(NH_4)_2S_2O_8$ | 0.20 |
| 8 | $SiO_2$, 5.3 | 100 | 2.6 $Al(NO_3)_3$, 2.2 $NH_4NO_3$ | 0.42 $NaIO_4$, 0.26 $(NH_4)_2S_2O_8$ | 0.19 |
| 9 | $SiO_2$, 8.5 | 40 | 2.6 $Al(NO_3)_3$, 2.2 $NH_4NO_3$ | 0.26 $NaIO_4$ | 0.25 |
| 10 | $SiO_2$, 8.5 | 40 | 2.6 $Al(NO_3)_3$, 2.2 $NH_4NO_3$ | 0.50 $NaIO_4$ | 0.25 |
| 11 | $SiO_2$, 6.4 | 40 | 2.6 $Al(NO_3)_3$, 2.2 $NH_4NO_3$ | 0.42% $NaIO_4$, 0.26 $(NH_4)_2S_2O_8$ | 0.28 |
| 12 | $SiO_2$, 6.4 | 40 | 2.6 $Al(NO_3)_3$ | 0.42 $NaIO_4$, 0.26 $(NH_4)_2S_2O_8$ | 0.26 |
| 13 | $SiO_2$, 6.4 | 40 | None | 0.42 $NaIO_4$, 0.26 $(NH_4)_2S_2O_8$ | 0.18 |

Referring to FIG. 1, the nickel removal rate increased as a linear function with the silica solid percentage.

The unique colloidal particle characteristics achieved atomic-scale smoothness and scratch-free polished surfaces. By using the described slurry compositions, the typical surface roughness (Ra) ranged from 1 Å to 2.5 Å measured by TMS 2000 and AFM apparatus. The colloidal particles described were solution-derived, amorphous-structured, and spherical-shaped particulate. Most advantageously, single discrete spheres dispersed individually in the aqueous medium to form the slurry suspensions. These non-coagulated, soft (amorphous) spheres most advantageously achieve a low roughness and defect-free polishing surfaces.

Most advantageously, optional anti-coagulation polymers prevent the colloidal spheres from agglomerating, flocculating, coagulating, and gelling. This stable dispersion achieved scratch-free and defect-free surfaces when polishing hard disks. Table 2 shows examples of the polymers that stabilize the silica colloid dispersions.

TABLE 2

Stability of Silica Suspension at Low pH

| Sample ID* | Mean Diameter (nm) | Stabilizer (anti-coagulation/ Anti-gelation agent) | wt %** | pH | 24 hr Stability |
|---|---|---|---|---|---|
| 1 | 100 | None | 0.1 | 2.0 | Gelled |
| 2 | 40 | None | 0.2 | 2.0 | Gelled |
| 3 | 100 | Polyethylene glycol | 0.1 | 2.0 | Thick |
| 4 | 100 | Sodium polyacrylate | 0.1 | 2.0 | Stable |
| 5 | 100 | sodium polyvinylsulfonate | 0.1 | 2.0 | Stable |
| 6 | 100 | sodium polystyrenesulfonate | 0.1 | 2.0 | Stable |
| 7 | 40 | polyethylene glycol | 0.2 | 2.0 | Gelled |
| 8 | 40 | sodium polyacrylate | 0.2 | 2.0 | Thick |
| 9 | 40 | sodium polyvinylsulfonate | 0.2 | 2.0 | Stable |
| 10 | 40 | sodium polystyrenesulfonate | 0.2 | 2.0 | Stable |
| 11 | 40 | polystyrenesulfonic-co-maleic acid, sodium salt | 0.2 | 2.0 | Stable |

Table 2 illustrates that strong anionic polymers, such as polystyrenesulfonate and polyvinylsulfonate, are the most effective under the described conditions. These anionic polymer molecules adsorb on the colloid particle surfaces and provide steric hindrance to prevent colloids from aggregating and stabilize the colloidal dispersions.

Most advantageously, buffering the slurry to an optimal pH range of about 1 to 5 achieves the optimal polishing performance. In this pH range, the metal oxide colloid surface protonates to carry electrostatic positive charges, which allow better adsorption of anionic characteristic polymers, and thus, better dispersion stability. In addition, this low pH region advantageously provides maximum effectiveness of the multi-oxidizer system and enhances its oxidation potential; and thus, it accelerates the chemical polishing rate. Maintaining the pH level below about 3 can further accelerate the substrate's removal. Most advantageously, this low pH region chemically removes the nickel metal from the disk's surface.

Alternatively, a relatively smooth nickel substrate surface can be obtained by polishing with a softer and smaller particle size alumina-based slurry. The experimental data show that very fine (0.10 to 0.25 μm) gamma phase slurries can readily achieve a roughness of less than about 3.5 Å.

The use of spherical metal oxide abrasive colloidal particles enhances the substrate surface characteristics, and minimizes or eliminates micro-surface defects. With this slurry hard disk manufacturers can significantly reduce the number of defective products, and cost of production. Optionally, the use of anti-coagulation agents 1) prevents the small abrasives from agglomerating; 2) allows simplified dispersing of the slurry; and 3) extends its shelf life. The use of stable and acidic multi-oxidizer systems enhances the polishing rate by as much as 250 percent and shortens polishing cycle time.

Although this invention disclosure presents only the selected examples of the hard disk polishing slurry compositions, it should be apparent to those skilled in the art that any slurry composition that satisfies the above characteristics will be applicable for the described application. For example, colloidal spheres of various metal oxide materials should be in general suitable for polishing agents. Any water-soluble, periodate salts, persulfate salts, nitric salts, permanganate salts, perchlorate salts, perbromate salts and their combinations should be suitable for oxidizers and co-oxidizers. Any anionic characteristic polymer such as sulfonate-containing polymer, carboxylate-containing polymer, and their derivatives should be suitable as colloidal dispersion stabilizers. In addition, these chemical materials can be applied to the slurry in the forms of either solids or aqueous solutions.

What is claimed is:

1. A polishing slurry comprising polishing particles having a mean particle diameter of less than about 5 $\mu$m, at least about 0.5 weight percent oxidizer, said oxidizer being selected from at least one of the group consisting of $HNO_3$, $Ni(NO_3)_2$, $Al(NO_3)_3$, $Mg(NO_3)_2$, $Zn(NO_3)_2$ and $NH_4NO_3$, a small but effective amount of at least one co-oxidizer selected from the group consisting of perbromates, perchlorates, periodates, persulfates, permanganates and ferric nitrate and balance water.

2. The polishing slurry of claim 1 containing about 0.75 to 7.5 weight percent oxidizer.

3. The polishing slurry of claim 1 including pH buffers for operating the slurry at a pH from about 1 to 5.

4. The polishing slurry of claim 1 wherein said co-oxidizer is selected from the group consisting of $KIO_4$, $NaIO_4$, $(NH_4)_2S_2O_8$, $K_2S_2O_8$, $Na_2S_2O_8$, $KMnO4$, $Al(ClO_4)_3$, $KClO_4$, $NaClO_4$, $NH_4ClO_4$ and $Fe(NO_3)_3$.

5. The polishing slurry of claim 1 wherein said slurry contains about 2 to 60 weight percent polishing particles, about 0.01 to 4 weight percent co-oxidizer and an anti-coagulation agent.

6. The polishing slurry of claim 1 wherein said co-oxidizer is a periodate.

7. The polishing slurry of claim 6 including an additive for binding elemental iodine.

8. A polishing slurry comprising about 2 to 60 weight percent of a dispersion of polishing particles, said polishing particles having a mean particle diameter of less than about 1 $\mu$m, about 0.75 to 7.5 weight percent oxidizer, said oxidizer being selected from at least of the group consisting of $HNO_3$, $Ni(NO_3)_2$, $Al(NO_3)_3$, $Mg(NO_3)_2$, $Zn(NO_3)_2$ and $NH_4NO_3$, about 0.01 to 4 weight percent at least one co-oxidizer selected from the group consisting of perbromates, perchlorates, periodates, persulfates, permanganates and ferric nitrate, an anti-coagulation agent and balance water.

9. The polishing slurry of claim 8 containing about 1 to 5 weight percent oxidizer.

10. The polishing slurry of claim 8 including pH buffers for operating the slurry at a pH from about 1 to 5.

11. The polishing slurry of claim 8 wherein said co-oxidizer is selected from the group consisting of $KIO_4$, $NaIO_4$, $(NH_4)_2S_2O_8$, $K_2S_2O_8$, $Na_2S_2O_8$, $KMnO_4$, $Al(ClO_4)_3$, $KClO_4$, $NaClO_4$, $NH_4ClO_4$ and $Fe(NO_3)_3$.

12. The polishing slurry of claim 8 wherein said slurry contains polishing particles selected from the group consisting of silica, alumina, ceria, zirconia and titania, about 0.05 to 2 weight percent co-oxidizer and about 0.001 to 5 weight percent anti-coagulation agent.

13. The polishing slurry of claim 8 wherein said co-oxidizer is a periodate.

14. The polishing slurry of claim 13 including an additive for binding elemental iodine.

15. A polishing slurry comprising about 2 to 60 weight percent of a dispersion of polishing particles selected from the group consisting of silica, alumina, ceria, zirconia and titania, said polishing particles having a mean particle diameter of about 0.01 to 1 $\mu$m, about 1 to 5 weight percent oxidizer, said oxidizer being selected from at least of the group consisting of $HNO_3$, $Ni(NO_3)_2$, $Al(NO_3)_3$, $Mg(NO_3)_2$, $Zn(NO_3)_2$ and $NH_4NO_3$, about 0.05 to 2 weight percent at least one co-oxidizer selected from the group consisting of perbromates, perchlorates, periodates, persulfates, permanganates and ferric nitrate, an anti-coagulation agent and balance water.

16. The polishing slurry of claim 15 wherein the oxidizer is $NH_4NO_3$.

17. The polishing slurry of claim 15 including pH buffers for operating the slurry at a pH from about 1 to 5.

18. The polishing slurry of claim 15 wherein said co-oxidizer is selected from the group consisting of $KIO_4$, $NaIO_4$, $(NH_4)_2S_2O_8$, $K_2S_2O_8$, $Na_2S_2O_8$, $KMnO_4$, $Al(ClO_4)_3$, $KClO_4$, $NaClO_4$, $NH_4ClO_4$ and $Fe(NO_3)_3$.

19. The polishing slurry of claim 15 containing about 0.001 to 5 weight percent anti-coagulation agent.

20. The polishing slurry of claim 15 containing an additive for binding iodine and said additive is selected from the group consisting of polyvinylpyridine, polyvinylpyrrolidone, polyvinylpyrrolidone, vinylpyrrolidone/vinylacetate, vinylpyrrolidone/vinylmethacrylate, vinylpyrrolidone/vinylacrylic acid, vinylpyrrolidone/styrene, vinylpyrrolidone/vinylcaprolactam and vinylpyrrolidone/vinylimidazole.

* * * * *